W. B. CHAPMAN AND D. MASON.
PROCESS OF MAKING OR TREATING PRODUCER GAS.
APPLICATION FILED MAR. 16, 1915.
1,361,137. Patented Dec. 7, 1920.
2 SHEETS—SHEET 1.
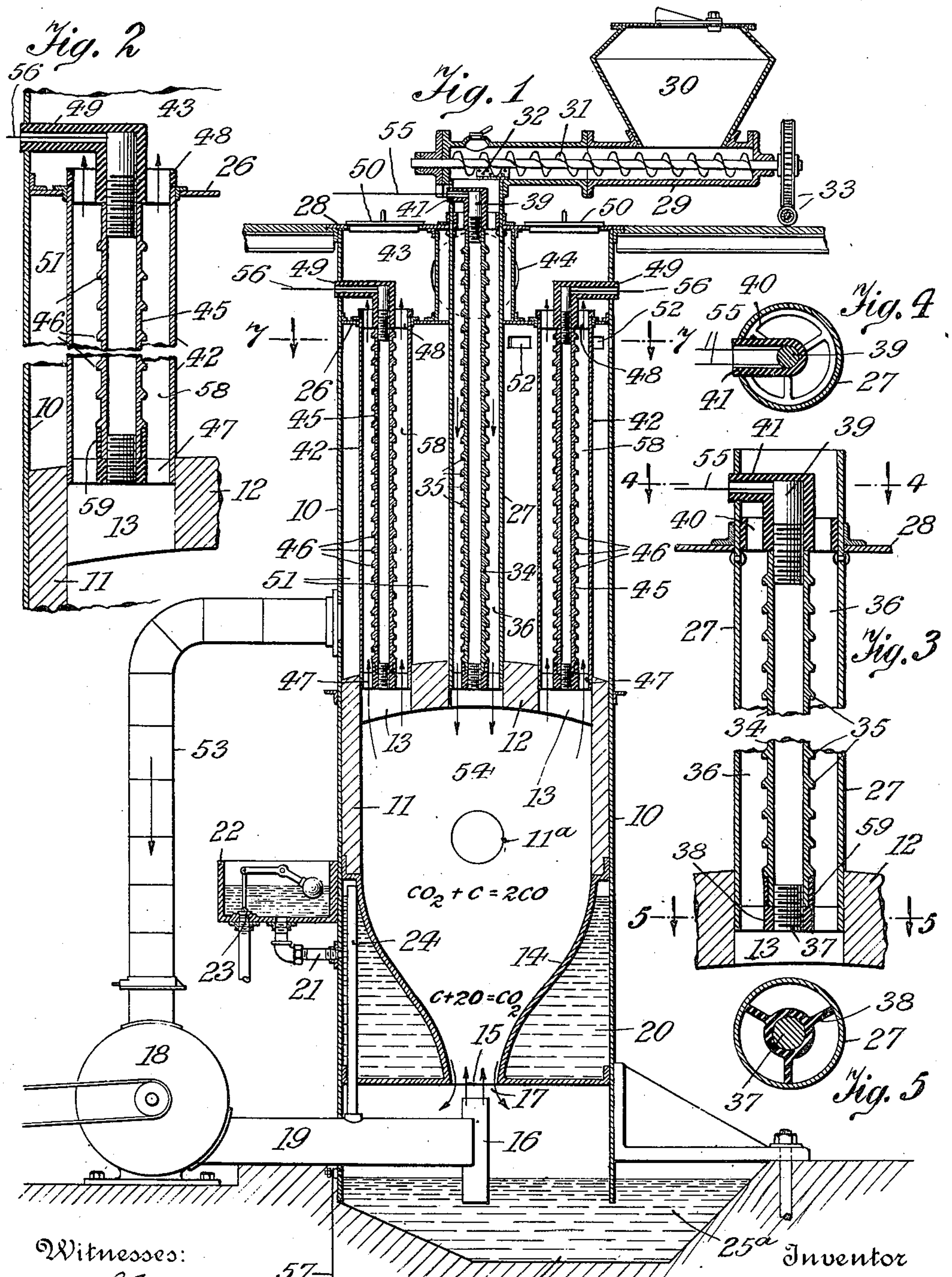
A. Spitznagel
Ida O. Krumm
William B. Chapman and David Mason
By their Attorneys
Briesen & Knauth W. B. CHAPMAN AND D. MASON.
PROCESS OF MAKING OR TREATING PRODUCER GAS.
APPLICATION FILED MAR. 16, 1915.
1,361,137.
Patented Dec. 7, 1920.
2 SHEETS—SHEET 2.
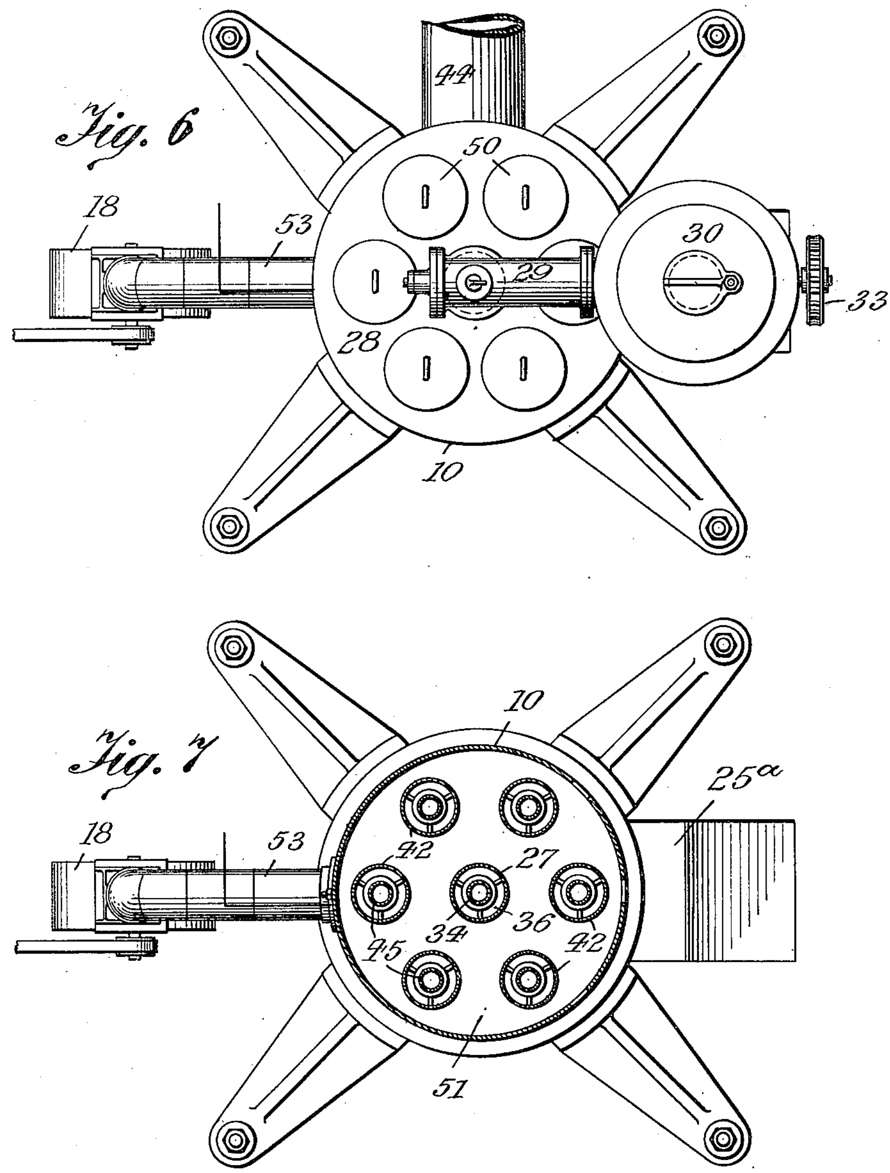
Witnesses:
A. Gutzwagel
Ida O. Krumm
Inventor
William B. Chapman and David Mason
By their Attorneys
Briesen & Knauth

UNITED STATES PATENT OFFICE.

WILLIAM B. CHAPMAN, OF MOUNT VERNON, OHIO, AND DAVID MASON, OF NEW YORK, N. Y., ASSIGNORS TO CHAPMAN ENGINEERING COMPANY, OF MOUNT VERNON, OHIO, A CORPORATION OF NEW YORK.

PROCESS OF MAKING OR TREATING PRODUCER-GAS.

1,361,137. Specification of Letters Patent. Patented Dec. 7, 1920.

Application filed March 16, 1915. Serial No. 14,719.

*To all whom it may concern:*

Be it known that we, WILLIAM B. CHAPMAN, and DAVID MASON, both citizens of the United States, and residents of Mount Vernon, county of Knox, and State of Ohio, and New York city, county and State of New York, respectively, have invented certain new and useful Improvements in Processes of Making or Treating Producer-Gas, of which the following is a specification.

This invention relates to a novel process of and apparatus for producing gas from coal and kindred substances in a simple, effective and economical manner. The numerous difficulties encountered in operating ordinary gas producers are well known, one of the principal objections being that the producers require a constant and intelligent observation by the attending workmen in order to produce a uniformly constituted gas. The proper operation of the producer plant thus depends to a high degree upon the retinue of a staff of skilled workmen. To solve this labor problem and overcome some of the many irregularities of operation, the powdered coal type of producers has been attempted, but so far has failed in practice because of the prohibitive amount of soot contained in the gas whenever the same is otherwise of good quality. Another disadvantage inherent in this type of producers consists in the necessity of shutting them down during ash removal.

We have overcome these and other difficulties by making use of the principle of ionizing, and applying the latter more particularly to the generated gas as the same leaves the gasifying chamber and while it is still hot. Owing to this ionizing process, the soot and other impurities contained in the gas, are precipitated and directly returned to the gasifying chamber, to be here subjected to renewed gasification. At the same time, the ionizing of the hot gas stimulates its chemical activity to such an extent as to complete the chemical reactions brought about within the gasifying chamber. Our novel process is equally applicable to powdered solid fuel as well as to atomized liquid fuel. When using solid fuel we prefer to ionize the same prior to gasification, whereby its chemical activity is stimulated and the chemical reactions which are to follow during gasification are intensified. In this way a pure gas having a high calorific value may be produced from a comparatively cheap grade of fuel in an economical, simple and thoroughly reliable manner.

The invention further comprises other novel features in producing gas as more fully brought out in the appended specification and claims.

In the accompanying drawing,

Figure 1 is a vertical section through an ionizing gas producer designed for the use of powdered solid fuel;

Fig. 2 an enlarged cross section, partly broken away through one of the outer gas-ionizing tubes and adjoining parts;

Fig. 3 a similar section through part of the central fuel-ionizing tube;

Fig. 4 a cross section on line 4—4, Fig. 3;

Fig. 5 a cross section on line 5—5, Fig. 3;

Fig. 6 a top view of Fig. 1, and

Fig. 7 a cross section on line 7—7, Fig. 1.

Our novel ionizing gas producer comprises essentially a preferably cylindrical metal shell 10 the lower portion of which incloses the gas producing means proper while within the upper portion thereof, the fuel and gas ionizing means are contained. The gas producing portion of shell 10 is lined with fire bricks 11 and has an arched roof 12 provided with a plurality of openings 13. Below lining 11 there is securely fitted into shell 10, an inverted bell-shaped insert 14, the inner diameter of said insert being gradually reduced from top to bottom to form a lower mouth 15 of relatively small diameter. Below mouth 15 and slightly spaced therefrom is provided an air supply pipe 16, the diameter of which is less than that of the mouth so as to provide an annular ash discharging space 17 as indicated in Fig. 1. This pipe is open throughout and its lower end dips into the water sealed ash-pit so that should ashes fall into the pipe they will pass freely through it into the ash pan below. Pipe 16 receives air under pressure from a suitable blower 18 through a tube 19 that preferably opens into said pipe in a tangential direction so as to impart a whirling movement to the air discharged from the upper open end of pipe 16. The space 20 formed between shell 10 and insert 14, is adapted for the reception of water or another cooling liquid supplied through a pipe 21 from a tank 22 controlled by a float-actuated valve 23. Within this tank, the water becomes vaporized, the generated vapor escaping through a pipe 24 into the tube 19 so as to provide the air blown into the gas producer with the necessary amount of moisture. Below the gas producer is located an ash pit 25 partly filled with water into which the shell 10 dips so as to constitute a water seal, more particularly at the channel 25[a] provided for ash removal. Shell 10 and lining 11 are provided with a normally closed opening 11[a] through which a torch or another heating implement may be introduced to start the gasification.

Slightly below its top, shell 10 is provided with a fixed cross plate or web 26 having a plurality of perforations that are arranged in axial alinement with the openings 13 of roof 12. Into the central opening 13 is fitted a fuel ionizing tube 27 that extends upward through the alined central perforation of web 26 and through a similar opening provided in the top plate 28 of the producer. At its upper open end, tube 27 communicates with a horizontally disposed conveyer casing 29 into which powdered coal or another finely divided fuel is introduced through a hopper 30. Within casing 29 is rotatably mounted a spiral conveyer 31 that feeds the fuel toward tube 27 and over a screen 32 so as to evenly distribute it as it drops through said tube. Casing 29 should be of such a length and the conveyer 31 should be so constructed and driven through gearing 33 as to sufficiently pack the fuel in said casing for effectively preventing the generated gas from leaking into the coal hopper through casing 29.

Within tube 27 is axially mounted a metallic electrode 34 provided with a plurality of circumferential ribs or other evenly distributed protuberances 35 for a purpose hereinafter more fully brought out, the ribs 35 being sufficiently spaced from the inner wall of tube 27 to form an intervening annular fuel passage 36. To the lower end of electrode 34 is attached, preferably by a metallic screw plug 37, a spider or holder 38 made of non-conductive material and firmly set into tube 27. In like manner, the upper end of electrode 34 is secured by a plug 39 to a fixed spider 40 made of non-conductive material and provided with an integral nipple 41 projecting outward through a corresponding perforation formed in tube 27 above top plate 28.

Into each of the outer openings 13 of roof 12 is fitted a gas-ionizing tube 42 that extends upward through the alined perforation of web 26 and opens into a gas chamber 43 formed intermediate said web and the top plate 28, from which chamber the generated gas is withdrawn through an outlet pipe 44. Into tube 42 is axially fitted a metallic electrode 45 provided with a plurality of circumferential ribs 46 and held in place by insulating spiders 47, 48 the parts 45, 47, 48 being in all respects substantial duplicates of the parts 34, 38, 40, with the only exception that the nipples 49 of holders 48 extend outwardly through corresponding perforations of shell 10. In alinement with each of the tubes 42 there is provided in top plate 28 an opening through which the electrodes may be removed, said opening being normally closed by a removable cover 50.

The space 51 formed within shell 10 and confined between the roof 12, web 26 and tubes 27, 42 constitutes an air preheating chamber into which air may enter through suitable inlet ports 52, the chamber 51 communicating with the blower 18 through a tube 53.

As thus far described it will be seen that the coal dust continuously supplied by conveyer 31 descends by gravity in the form of a more or less dense stream through the annular space formed between tube 27 and electrode 34 to be thence discharged into the gas producing chamber 54. Within the latter the descending coal particles encounter the air supplied by pipe 16 and rising through said chamber. Within the lower portion of insert 14 the fuel is, during the normal operation of the producer, burnt to form carbon dioxid according to the formula

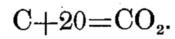

$$C+2O=CO_2.$$

Owing to the relatively increased quantity of carbon encountered within the upper part of chamber 54, while the percentage of oxygen decreases, carbon monoxid is formed according to the formula

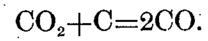

$$CO_2+C=2CO.$$

It will thus be seen that the production of gas takes place while the light particles of the powdered coal descend within chamber 54 so that the latter does not contain any layer of packed coal whatsoever as is the case with the gas producers heretofore generally known, a comparatively low air pressure being sufficient to retard the velocity of the coal particles to such an extent as to cause complete gasification before such particles could arrive in the vicinity of mouth 15. As the air supply pipe 16 is of smaller size than mouth 15, the ashes formed will be free to descend along the curved surface of insert 14 and to be finally discharged into the ash pit 25 through the annular space formed between said pipe and mouth.

In order to increase the purity and calorific value of the produced gas, the descending pulverized fuel as well as the gas itself is ionized by the use of high tensioned high-frequency electric current. We prefer to use for the ionizing of the gas an alternating current of about 30,000 volts and less than one ampere, while for ionizing the fuel, less voltage may be sufficient but we desire it to be distinctly understood that we do not bind ourselves to the data given but that they may be varied as conditions may require. So also the above mentioned alternating ionizing current may be replaced by direct current if desirable. The ionizing current for the fuel is supplied to electrode 34 through plug 39 and wires 55, while the ionizing current for the gas is supplied to electrodes 45 through wires 56, both of said ionizing currents returning through the metallic structure of the gas producer for which purpose said structure is grounded as at 57.

As soon as the current is applied powerful continuous electrical discharges of the corona type will take place between the protuberances of electrode 34 and tube 27. As the fuel passes through this electrically charged atmosphere it becomes ionized, every minute particle receiving its charge, thereby setting up an active molecular bombardment. The latter not only stimulates chemical activity but tends to intensify the chemical reactions which are to follow during gasification.

After having thus passed through the ionizing chamber 36, the fuel descends within the gasifying chamber 54 through the bottom opening of which a blast of preheated air laden with steam is admitted, while the heavy ashes will pass down around the sides of the air blast and escape into the ash pit. When the ionized coal dust strikes the blast of air it is instantly converted into producer gas which flows upwardly through the gas ionizing chambers or passages 58 formed between the several tubes 42 and the electrodes 45. In passing through these chambers, the tar, soot and other impurities carried along by the gas are agglomerated by the molecular bombardment caused by the continuous electrical corona discharges taking place between the protuberances of electrodes 45 and tubes 42. These agglomerated particles will thus fall back into the chamber 54 to be again subjected to the gasifying process. The ionizing of the gas molecules within chambers 58 further stimulates their chemical activity thus bringing about a more complete reaction and rendering possible the formation of a high grade producer gas. In other words the ionizing of the producer gas directly after generation and while the same is still hot, animates the chemical activity to such an extent as to complete the reactions started within the chamber 54. From the top of chambers 58 the gas passes into collecting chamber 43 to be led through conduit 44 to the furnaces or other heat consuming devices that do not require a washed gas. If desired a dust catcher of suitable construction may be employed to remove any fine particles of ashes or soot which may still escape with the ionized gas. In case a washed gas is required it is obvious that but a moderate amount of washing is necessary.

Owing to the distribution of the electrode-ribs or other protuberances over the entire length of said electrode an evenly distributed electrical discharge is obtained within the ionizing chambers thus insuring a complete ionizing process.

Provisions are further made for burning any accumulations of coal dust, soot and tar that may have been formed on the electrode-supporting spiders, thus preventing the formation of arcs and short circuits. For this purpose the same conductors that form part of the ionizing circuits are utilized for supplying a second current of low voltage and high amperage. This circuit will be interrupted as long as no deposits have been formed on said spiders, but as soon as the apparatus has become partially clogged with soot, etc., a flow of said current will be automatically started and continued until said soot has been burnt out whereupon the current will be again automatically interrupted. In order to further impede the formation of objectionable arcs at the lower spiders 38, 47 their hubs which are also made of insulating material, are elongated upward as at 59, so as to prolong the surface distance between the electrodes and the surrounding tubes.

It may here further be stated that in case a finely pulverized gas coal of good quality is employed, the ionizing of said coal may be dispensed with, without departing from the spirit of our invention, the ionizing of the hot gases being in fact of more importance than the ionizing of the fuel.

Our improved method of an apparatus for producing gas has the advantage that a clinkering of the producer and other irregularities of operation are prevented, while at the same time a cheaper grade of coal may be used for producing a gas of superior quality when compared with the methods and apparatus hitherto generally employed.

Although we have described our invention with special reference to the attached drawings, it is obvious that various changes may be made in the construction of the apparatus and that such modified constructions may nevertheless fall within the scope of the appended claims.

We claim:—

1. The process of making producer gas, which comprises leading the fuel from which the gas is to be produced to a heated gasifying chamber, withdrawing the resulting gas from said chamber and subjecting it to the action of an ionizing medium while still hot from the gasifying operation.

2. The process which comprises leading carbon containing fuel to a heated gasifying chamber, withdrawing the resulting mixture of gas and ungasified particles of fuel from said chamber, and subjecting such mixture to the action of an ionizing medium while being so withdrawn, and within the range of heat of the gasifying chamber.

3. The process of treating heated producer gas, carrying suspended particles of ungasified fuel, which comprises subjecting the same to the action of an ionizing medium while the fuel is near its gasifying temperature.

4. The process of making a fixed gas, which comprises leading the substance from which the gas is to be made to a heated gasifying chamber, and subjecting the gas while still hot from the gasifying operation, and containing particles of ungasified matter, to the action of an ionizing medium, to complete the gasifying of said particles or deposit them from the gas.

5. The process which comprises leading carbon containing fuel to a heated gasifying chamber, withdrawing the resulting mixture of gas and ungasified particles of fuel from said chamber, and subjecting such mixture to the action of an ionizing medium while being so withdrawn whereby ungasified particles may be returned to the producer for further gasification.

6. The process of treating a heated gas containing solid particles of fuel from which the gas was produced, which consists in subjecting the same to the action of an ionizing medium while the fuel is near its gasifying temperature.

7. The process of making producer gas which consists in subjecting the fuel from which the gas is to be produced to an ionizing medium, by heat and gasifying the ionized fuel by heat, the ionizing operation being conducted within the range of influence of the heat of the gasifying operation.

8. The process of making producer gas which consists in subjecting the fuel from which the gas is to be produced to an ionizing medium, gasifying the ionized fuel by heat and subjecting the resulting gas while within the range of influence of the heat of the gasifying operation to the action of an ionizing medium.

9. The process of treating heated producer gas containing solid particles of powdered coal which consists in subjecting the same to the action of an ionizing medium while at a temperature adjacent the gasifying point of the coal.

10. The process of making producer gas from powdered coal which consists in subjecting the coal to an ionizing medium as it passes into a heated gasifying chamber, gasifying the coal in such chamber and subjecting the resulting producer gas while still hot to the action of an ionizing medium.

11. The process of making producer gas from powdered coal which consists in subjecting the coal to an ionizing medium as it passes into a heated gasifying chamber, gasifying the coal in such chamber and subjecting the resulting producer gas to the action of an ionizing medium.

WILLIAM B. CHAPMAN.
DAVID MASON.